United States Patent [19]

Digre

[11] Patent Number: 5,437,237
[45] Date of Patent: Aug. 1, 1995

[54] CONTINUOUS PYROLYSIS SYSTEM

[76] Inventor: John L. Digre, 4612 Hazelwood Ave., Sacramento, Calif. 95821

[21] Appl. No.: 218,222

[22] Filed: Mar. 24, 1994

[51] Int. Cl.⁶ .............................................. F23G 5/12
[52] U.S. Cl. .................................. 110/346; 110/229; 432/59
[58] Field of Search ............... 110/229, 341, 346, 250, 110/257; 392/420, 421, 422; 202/117; 201/25; 48/65, 203, 209; 432/59

[56] References Cited

U.S. PATENT DOCUMENTS

| | | | |
|---|---|---|---|
| 1,293,285 | 2/1919 | Wood | 110/230 |
| 3,707,355 | 12/1972 | Anderson | 110/229 X |
| 4,080,158 | 3/1978 | Kondo et al. | 432/59 |
| 4,802,424 | 2/1989 | McGinnis, III et al. | 110/229 X |

Primary Examiner—Denise L. Gromada
Attorney, Agent, or Firm—Bernhard Kreten

[57] ABSTRACT

A continuous pyrolysis system includes an enclosure which receives an influx material at an entrance thereto and discharges a pyrolysate at a discharge therefrom. The entrance directs influx material into the enclosure while evacuating oxygen from the influx material. A conveyor is provided within the enclosure transporting the influx material from the entrance to the discharge. Pyrolysis is caused by a series of heat sources overlying the conveyor belt, the heat sources each including a parabolic reflective surface to enhance radiation heat transfer into the influx material. The pyrolysate is discharged in solid form through an output auger, in liquid form through a liquid outlet and in gaseous form through a gas outlet. The continuous pyrolysis system includes controls to provide a speed of the conveyor belt, completeness of the pyrolysis process, temperature of the heat sources and maintenance of an anaerobic environment within the enclosure.

19 Claims, 10 Drawing Sheets

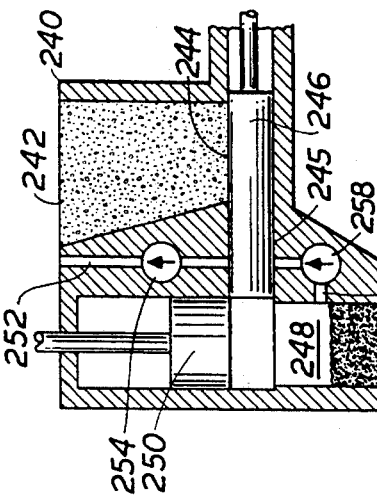
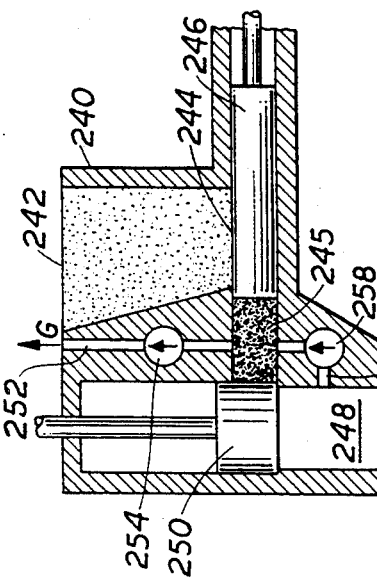
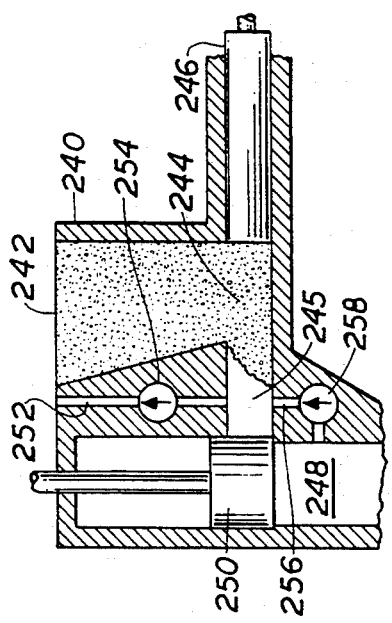
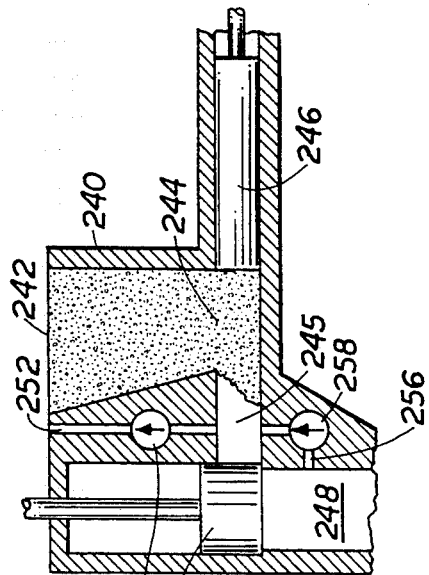
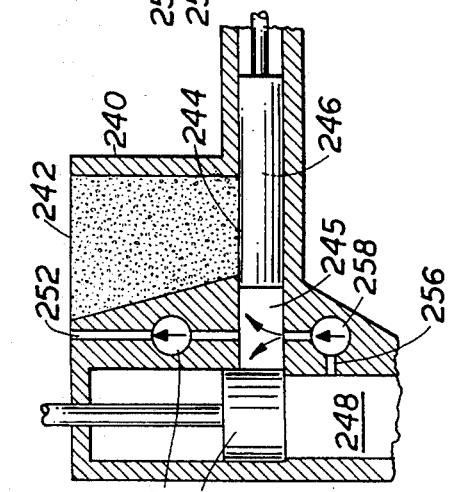

CONTINUOUS PYROLYSIS SYSTEM

FIELD OF THE INVENTION

The following invention relates to systems for pyrolysis of materials into their constituent pyrolysates. Specifically, this invention relates to continuous pyrolysis systems which pyrolize an influx of material within an anaerobic environment.

BACKGROUND OF THE INVENTION

Society's enhanced awareness of environmental concerns associated with effective disposal of waste material, especially toxic waste, has led to the development of numerous devices for pyrolizing waste. These pyrolysis systems generally exhibit one of three major drawbacks.

Some pyrolysis systems burn influx material and release by-products of combustion into the atmosphere. These products thus increase an environmental air quality problem while attempting to achieve solid waste disposal. Also, the resulting by-products have little value.

Some pyrolysis systems are known which are anaerobic and which produce valuable pyrolysates, but which must process influx material in discrete batches. These pyrolysis systems are not capable of continuously pyrolizing influx material without periodically exposing an anaerobic pyrolizing chamber therein to the outside environment.

Many pyrolysis systems combust influx material and create by-products which no longer contain readily available chemical energy. Some of these systems utilize energy generated during the pyrolysis to generate heat which in turn can be used to boil steam within a power plant or for some other power output. These systems fail to capture and store pyrolysates in a form which still possesses a high level of chemical energy and which can then be used for a variety of different useful purposes including later use in power production.

The patent to Horton represents a continuous pyrolysis system which avoids discharging contaminating output into the environment, can continuously process influx material and which outputs pyrolysates in a form still having a high level of chemical energy. Horton represents an early stage in the evolution of continuous anaerobic pyrolysis systems. For example, Horton teaches a "revolving door"-type entrance that accepts influx material along with air trapped therein.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PAT. NO. | ISSUE DATE |
| --- | --- | --- |
| Hobbs, et al. | 3,648,630 | March 14, 1972 |
| Kemp | 4,052,265 | October 4, 1977 |
| Herbold, et al. | 4,084,521 | April 18, 1978 |
| Kolze, et al. | 4,311,102 | January 19, 1982 |
| Brewer | 4,402,791 | September 6, 1983 |
| Tomita, et al. | 4,577,564 | March 25, 1986 |
| Tomita, et al. | 4,645,065 | February 24, 1987 |
| Keough | 4,648,328 | March 10, 1987 |
| Horton | 4,900,401 | February 13, 1990 |
| DiSanto, Sr. | 5,099,771 | March 31, 1992 |
| Jarrell | 5,230,777 | July 27, 1993 |

OTHER PRIOR ART (Including Author, Title, Date, Pertinent Pages, Etc.)

Huston Enterprises, Inc., "Industrial Shredders", entire brochure, date unknown.

The device of the instant invention is distinguishable from the prior art devices listed and described generally above in that, inter alia, a heating system is provided which more effectively pyrolizes influx material. An entrance into an anaerobic enclosure is provided which more effectively removes oxygen from the influx material than prior art devices. Provision is also made for capturing liquid precipitating out of gas which is discharged from the system. Control systems are provided for effective automatic or semi-automatic operation of the pyrolysis system.

SUMMARY OF THE INVENTION

The continuous pyrolysis system of this invention performs pyrolysis within an enclosure which is sealed from the outside environment. The enclosure can thus be purged of oxygen to provide an anaerobic environment which facilitates pyrolysis without combustion. The enclosure includes an entrance spaced from a discharge. The entrance allows influx material to enter therethrough without allowing a substantial amount of air, including oxygen, to pass through the entrance and into the enclosure along with the influx material. Once the influx material has passed through the entrance and into the enclosure, the influx material is placed upon a conveyor belt. The conveyor belt carries the influx material from the entrance to the discharge. A plurality of heat sources are oriented overlying the conveyor belt. The heat sources radiate heat down onto the influx material, elevating a temperature of the influx material. The heat sources transfer sufficient heat into the influx material to cause pyrolysis of the influx material into constituent pyrolysates.

The pyrolysates can be generally categorized as solid pyrolysates, liquid pyrolysates and gas pyrolysates. The gas pyrolysates become airborne within the enclosure during the pyrolysis process. The gas pyrolysates are then output from the enclosure through a gas outlet. The gas outlet is in communication with a condensor which cools the gas pyrolysate and precipitates liquid pyrolysate for separate collection from the gas pyrolysate.

The liquid pyrolysate within the enclosure migrates down onto a drain tray oriented below the conveyor belt. The drain tray then directs the liquid pyrolysate to a liquid outlet. The liquid outlet communicates with a container through a gas trap to prevent gas pyrolysate from passing out of the liquid pyrolysate outlet and exterior gases from entering the enclosure.

The solid pyrolysate remains on the conveyor belt until it is transferred to an end of the enclosure distant form the entrance where it is unloaded into a discharge chute. The discharge chute has a discharge auger at a lowermost portion thereof. The discharge auger rotates causing the solid pyrolysate to be translated out of the enclosure.

Influx material travels through the enclosure until it is pyrolized into constituent pyrolysates. These pyrolysates are then outputted from the enclosure in a manner which prevents substantial amounts of air, including oxygen, from entering the enclosure. In this way, an anaerobic environment is maintained within the enclosure and combustion is prevented during the continuous pyrolysis.

OBJECTS OF THE INVENTION

Accordingly, it is a primary object of the present invention to provide a system for pyrolizing material into constituent compounds which still contain readily available chemical energy.

Another object of the present invention is to provide a system for pyrolizing solid organic compounds, such as rubber, into carbon black, hydrocarbon gas and hydrocarbon liquid.

Another object of the present invention is to provide a system for disposal of refuse in a manner producing useful output.

Another object of the present invention is to provide a system for detoxifying materials passing therethrough.

Another object of the present invention is to provide a continuous pyrolysis system which includes an entrance which precludes substantial amounts of oxygen from entering therein along with influx material.

Another object of the present invention is to provide a continuous pyrolysis system which is controlled in a manner insuring complete pyrolysis, positive pressure within an enclosure of the system, and preclusion of air, including oxygen, from passing into the enclosure.

Another object of the present invention is to provide a continuous pyrolysis system which does not require exposure of an enclosure thereof to an outside environment except for periodic maintenance and repairs.

Another object of the present invention is to provide a pyrolysis system which can simultaneously dispose of unwanted articles while generating by-products of a commercial value without contamination of a surrounding environment in a safe and effective manner.

Another object of the present invention is to provide a system which can decontaminate soil by pyrolizing toxic substances within the soil.

Viewed from a first vantage point, it is an object of the present invention to provide a system for continuously pyrolizing material into a pyrolysate of different constituents while in a substantially anaerobic environment, comprised of an enclosure having a substantially anaerobic interior, means for heating the material within said enclosure, means for entering the material into said enclosure at an entrance, means for removing the pyrolysate from said enclosure at a discharge, and means for conveying the material from said entrance towards said discharge; said entrance including means to evacuate oxygen from the material entering said enclosure at said entrance.

Viewed from a second vantage point, it is an object of the present invention to provide a system for continuous anaerobic pyrolysis of influx material, comprised of an enclosure having an entrance and a discharge and a substantially anaerobic interior, means for entering influx material into said enclosure at said entrance, means for removing the pyrolysate from said enclosure at said discharge, and means for heating the influx material within said enclosure, said heating means including a plurality of heat sources each located near a focus of a parabolic reflecting surface, said surface oriented to direct radiation toward the influx material.

Viewed from a third vantage point, it is an object of the present invention to provide a method for continuously pyrolyzing an influx material into different constituent compounds within an anaerobic environment, including the steps of providing an enclosure with an entrance, a discharge and a heating means therein, defining a quanta of influx material to be entered into the enclosure, compressing the quanta of influx material, purging oxygen from the quanta of influx material, entering the quanta of influx material into the enclosure without substantial oxygen coupled thereto, activating the heating means to pyrolize the influx material into pyrolysates, and discharging the pyrolysates from the disclosure.

These and other objects will be made manifest when considering the following detailed specification when taken in conjunction with the appended drawing figures.

BRIEF DESCRIPTION OF THE DRAWINGS

FIGS. 10 through 15 reveal details of an alternative embodiment of this invention showing stages of influx material loading and anaerobic conditioning at an entrance to the system of this invention.

DESCRIPTION OF PREFERRED EMBODIMENTS

Figure 1:
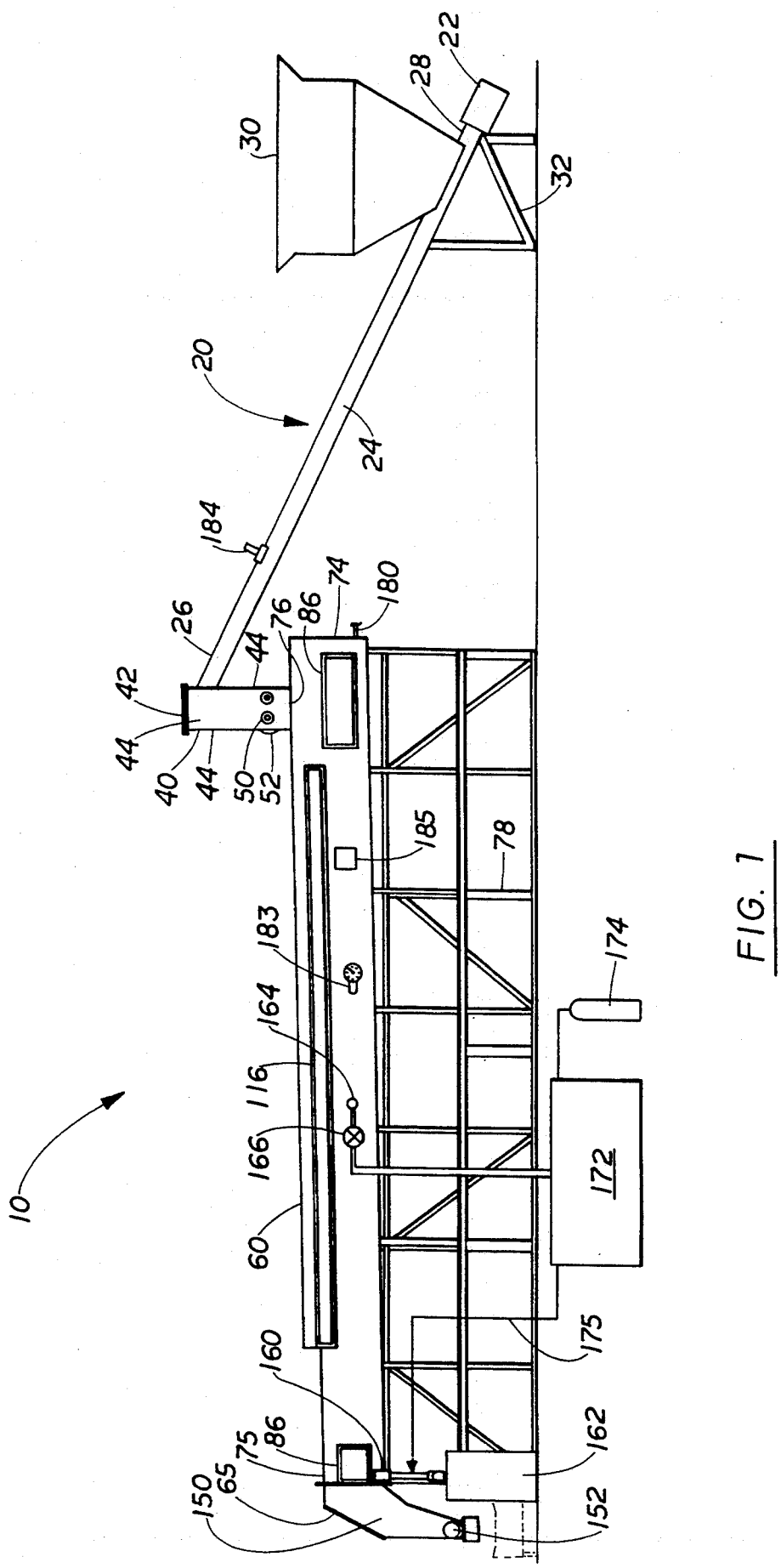
FIG. 1 is an elevational view of the system of this invention according to one embodiment.

Considering the drawings, wherein like reference numerals denote like parts throughout the various drawing figures, reference numeral 10 is directed to a continuous pyrolysis system according to the present invention.

The system 10 (FIG. 1) provides an anaerobic environment within an enclosure 60. The enclosure 60 has a heating system 100 therein (FIG. 3) which sufficiently heats an influx material M (FIG. 2) to pyrolize the influx material into a solid pyrolysate SP (FIG. 3), a liquid pyrolysate LP (FIG. 3), and a gas pyrolysate GP (FIG. 3).

In essence, and with reference to FIG. 1, the system 10 includes an influx auger 20 delivering influx material M from an in-feed hopper 30 to an influx shaft 40. The influx shaft 40 passes the influx material M (FIG. 2) into the enclosure 60 in a manner which prevents substantial amounts of oxygen from entering the enclosure 60 along with the influx material M. A conveyor belt 80 (FIG. 2) is provided within the enclosure 60 which transports the influx material M from the influx shaft 40 to a discharge chute 150. The heating system 100 (FIG. 2) overlies the conveyor belt 80 and pyrolizes the influx material M passing thereunder. Solid pyrolysate SP (FIG. 3) passes out of the enclosure 60 through the discharge chute 150. Liquid pyrolysate LP (FIG. 3) is outputted from the enclosure 60 through an oil outlet 160. Gas pyrolysate GP (FIG. 3) is outputted from the enclosure 60 through a gas outlet 164 (FIG. 1).

Figure 2:
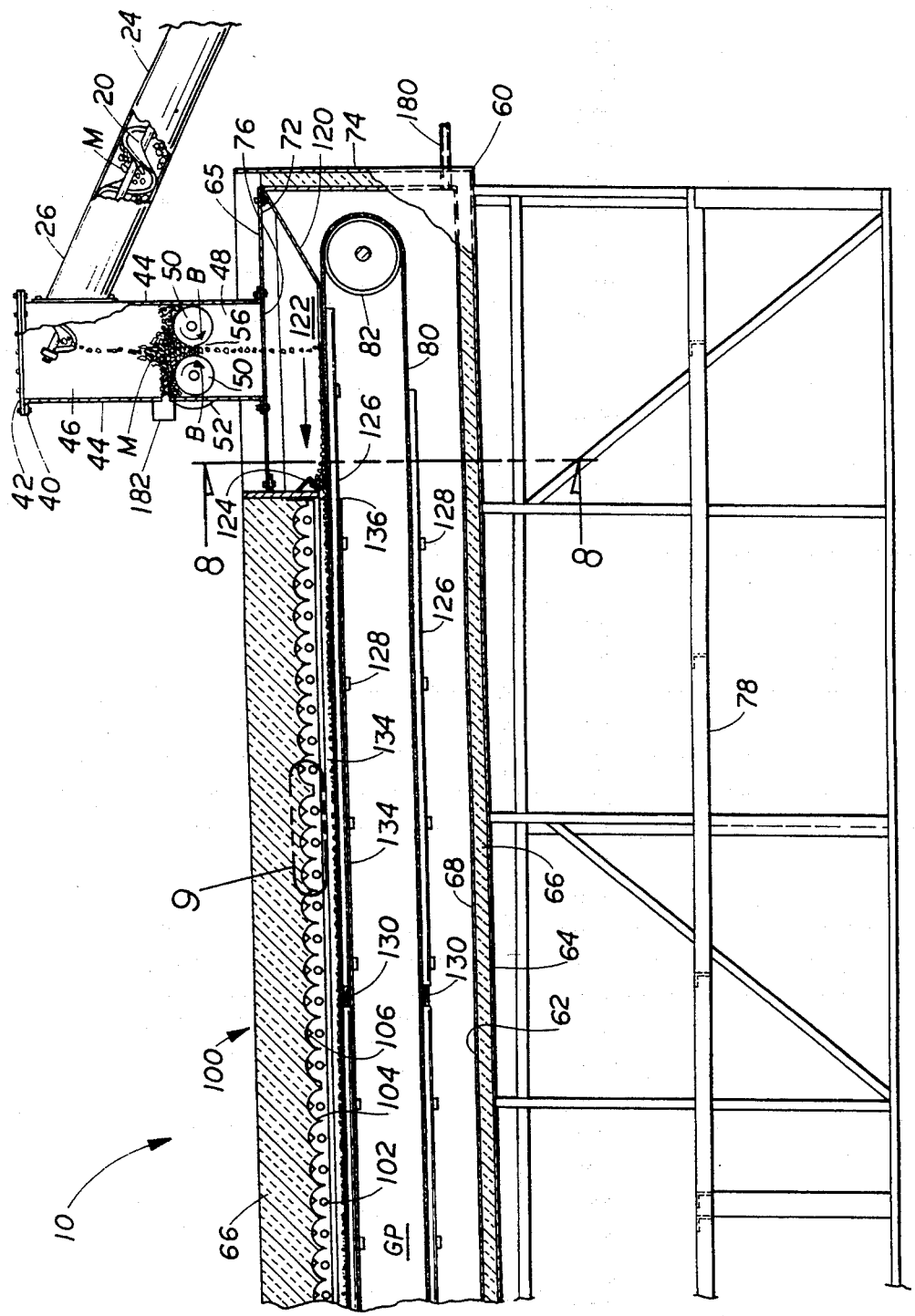
FIG. 2 is a detail of a portion of that which is shown in FIG. 1 with portions thereof cut away to reveal interior details.
Figure 3:
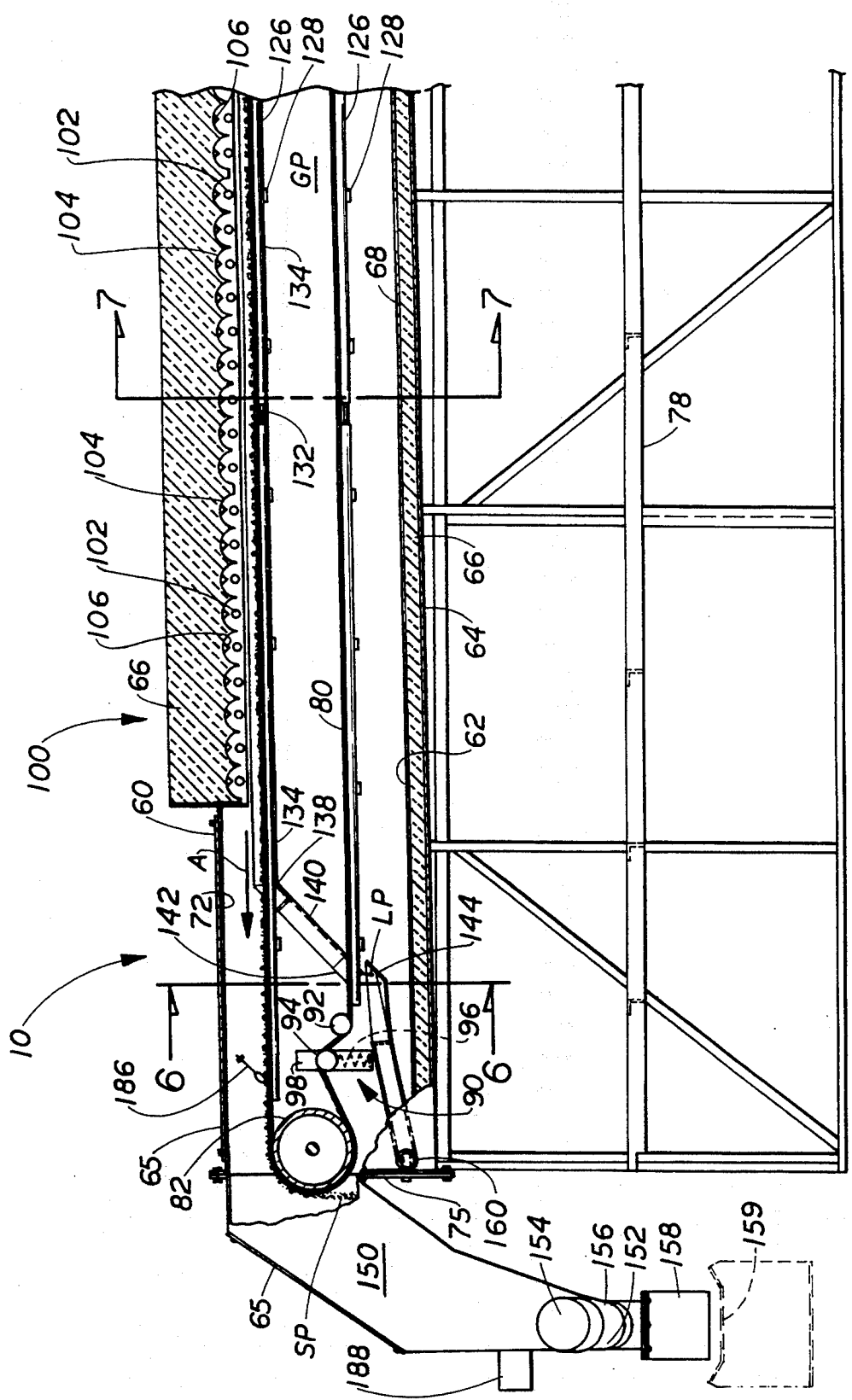
FIG. 3 is a detail of a portion of that which is shown in FIG. 1 with portions thereof cut away to reveal interior details.
Figure 4:
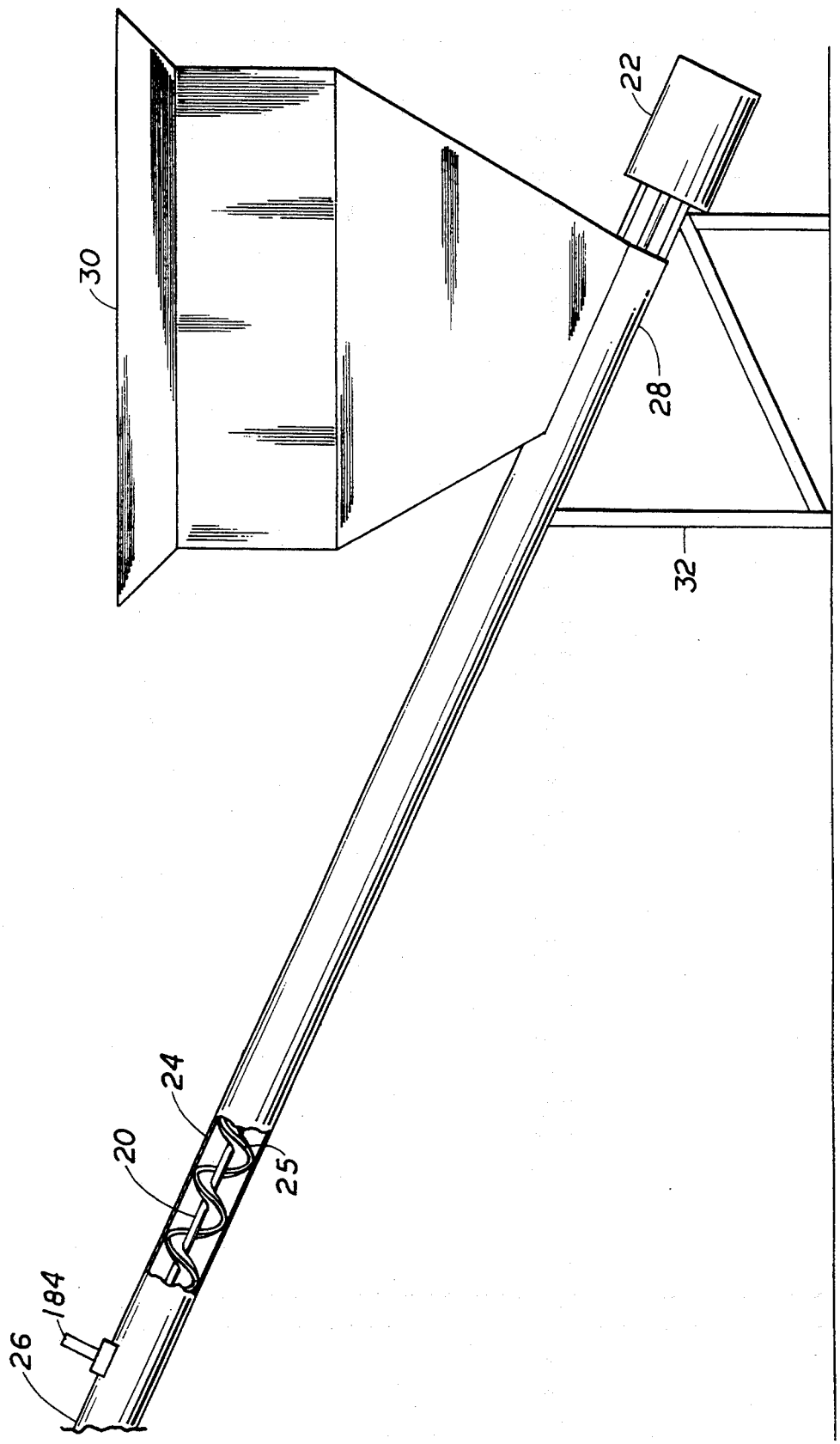
FIG. 4 is a detail of that which is shown in FIG. 1 with portions cut away to reveal interior details.

More specifically, and with reference to FIGS. 1, 2 and 4, details of portions of the system 10 which enter influx material M into the enclosure 60 are described. Influx material M which is to be pyrolized by the system 10 is initially placed within the in-feed hopper 30. While various different influx materials M can be utilized within the system 10, some influx materials M which appear to particularly benefit from pyrolysis include solid hydrocarbons such as rubber from shredded tires. Also, soil contaminated with hydrocarbons or other toxins can be pyrolized within the system 10.

The in-feed hopper 30 preferably has a lower portion thereof in communication with a lower end 28 of the influx auger 20. The in-feed hopper 30 and lower end 28 of the influx auger 20 are preferably supported above the ground by a structural support 32. The influx auger 20 is supported within a casing 24 and is operatively coupled to a motor 22 at the lower end 28 of the influx auger 20. An upper end 26 of the influx auger 20 communicates with an influx shaft 40 which leads into the enclosure 60 of the system 10.

The influx auger 20 preferably has an extreme radial tip 25 thereof coated with a material such as Teflon to provide a seal with the casing 24. Thus, when the motor 22 causes the influx auger 20 to rotate, influx material M is drawn from the in-feed hopper 30 to the influx shaft 40.

The influx shaft 40 is a hollow structure including a lid 42 resting upon upper edges of side walls 44 supported upon an upper surface of the enclosure 60. The influx shaft 40 includes an upper volume 46 within an interior thereof adjacent the lid 42 and a lower volume 48 within the influx shaft 40 and below the upper volume 46. Two feed rollers 50 pass between opposite side walls 44 of the influx auger 40 between the upper volume 46 and the lower volume 48. The feed-rollers 50 are spaced by a gap 56 therebetween.

A feed motor 52 is operatively coupled to the feed-rollers 50 through a drive system 54 which causes the feed rollers 50 to rotate in opposite directions, along arrows B, with upper surfaces thereof rotating toward the gap 56. The feed-rollers 50 thus drawn influx material M from the upper volume 46 to the lower volume 48. Preferably, the upper volume 46 is maintained with a sufficient amount of influx material M to inhibit somewhat the passage of gases through the gap 56. The gap 56 is sized to minimize gas inflow and outflow therethrough and to cause some compression of the influx material M as it passes therethrough. This compression tends to "squeeze" gases away from the influx material M before the influx material M passes into the lower volume 48.

With reference now to FIGS. 10 through 15, details of an alternative embodiment replacing the influx auger 20, in-feed hopper 30 and influx shaft 40 are described. An influx loader 240 is provided which is mountable upon the enclosure 60. The influx loader 240 includes an upper bin 242 which supports influx material M therein and is readily accessible from the outside environment. The upper bin 242 has a feeder slot 244 at a lower end thereof. The feeder slot 244 is in communication with a compression chamber 245. The compression chamber 245 includes a piston 246 on one end thereof and a plunger 250 on an opposite end thereof. The plunger 250 is in communication with a feeder shaft 248 which is in communication with an interior of the enclosure 60.

The piston 246 is translatable horizontally toward the compression chamber 245 and away from the compression chamber 245. When the piston 246 is translated toward the compression chamber 246, the feeder slot 244 is sealed from the compression chamber 245 by the piston 246. The piston 246 thus acts as a valve between the feeder slot 244 and the compression chamber 245.

The plunger 250 is translatable vertically from a compression position adjacent the compression chamber 245 and an open position with the plunger 250 spaced from the compression chamber 245 and with the compression chamber 245 and feeder shaft 248 communicating together without obstruction. The plunger 250 thus acts as a valve between the compression chamber 245 and the feeder shaft 248.

An air outlet passage 252 is in fluid communication both with the compression chamber 245 and the outside environment. The air passage 252 provides a conduit by which air can escape, along arrow G of FIG. 11, from the influx material M when the influx material M is compressed. An air valve 254 is positioned along the air passage 252 to prevent air from traveling into the compression chamber 245 through the air passage 252. An anaerobic gas passage 256 is in fluid communication with the feeder shaft 248 and the compression chamber 245. The anaerobic gas passage 256 delivers gas into the compression chamber 245, along arrow H of FIG. 14, to more easily allow movement of the piston 246 away from the compression chamber 245 and to assist in purging air out of the compression chamber 245. An anaerobic gas valve 258 is interposed along the anaerobic gas passage 256. The valve 258 prevents oxygen from passing through the passage 256 and into the feeder shaft 248.

In use and operation, the influx loader 240 is preferably used in the following manner. Initially (FIG. 10), the plunger 250 is oriented adjacent the compression chamber 245 and the piston 246 is oriented distant from the compression chamber 245 with valves 254, 258 closed. This orientation allows influx material M to pass from the upper bin 242, through the feeder slot 244 and into the compression chamber 245. Once the compression chamber 245 has filled with influx material M, the air valve 254 is opened and the piston 246 is translated toward the compression chamber 245 (FIG. 11). The piston 246 thus causes a significant amount of air trapped interstitially between individual pieces of the influx material M to be forced through the air passage 252 and out of the compression chamber 245 along arrow G.

Once the influx material M has been fully compressed by the piston 246, the air valve 254 is closed. The plunger 250 is then elevated away from the compression chamber 245 until the compression chamber 245 is in communication with the feeder shaft 248. The piston 246 is then translated further toward the compression chamber 245 until the influx material M has been deposited into the feeder shaft 248 (FIG. 12). The plunger 250 is then returned to a position adjacent the compression chamber 245 (FIG. 13).

Next, the anaerobic gas valve 258 is opened and the piston 246 is translated away from the compression chamber 245. The compression chamber 245 is thus filled with anaerobic gas along arrow H (FIG. 14). The anaerobic gas valve 258 is then closed and the piston 246 is translated further away from the compression chamber 245 to allow the influx material M to again pass from the upper bin 242 through the feeder slot 244 and into the compression chamber 245 (FIG. 15). The compression process is then repeated.

Although individual quanta of influx material M pass through the influx loader 240, these quanta are loaded without substantial alteration of the enclosure 60 environment. Thus, no reestablishment of an anaerobic condition need be done during operation of the continuous pyrolysis system 10. The influx loader 240 can also be used in conjunction with the hopper 30, influx auger 20 and influx shaft 40. For instance, the influx loader 240 could be oriented between the in-feed hopper 30 and the influx auger 20. In this way, the auger 20 would operate in a substantially anaerobic environment.

Referring now to FIGS. 2, 3 and 6 through 9, details of the enclosure 60 are described. The enclosure 60 includes an inner hull 62 nested within and spaced from an outer hull 64. A space between the inner hull 62 and outer hull 64 is filled with insulation 66. The inner hull 62 includes a floor 68 forming a bottom surface of the enclosure 60, sides 70 on longitudinal sides of the enclosure 60, a ceiling 72 forming an uppermost surface of the enclosure 60 and ends 74, 75 defining longitudinal extremities of the enclosure 60.

The enclosure 60 is thus essentially an orthorhombic parallelopiped in form. The enclosure 60 is configured such that the inner hull 62 and outer hull 64 are substantially imperforate so that gases may not readily travel into or out of the enclosure 60. Access ports 65 are incorporated into the enclosure 60 such that the enclosure 60 can be readily accessed for maintenance. The access ports 65 are closed with seals to prevent leaks thereat.

The insulation 66 is preferably formed from vermiculite around the uppermost portions of the enclosure 60 which are generally hotter than lowermost portions of the enclosure 60. The insulation 66 preferably has sufficient resistance to heat transfer that an exterior surface of the enclosure 60 is not hot enough to present a burn or fire hazard.

The enclosure 60 is preferably angled slightly such that the floor 68 has a higher elevation at an inlet end 74 than at a discharge end 75. This angling of the enclosure 60 causes liquid pyrolysates LP within the enclosure to travel toward the discharge end 75. Also, this allows gasses having different molecular weights which may be generated by the pyrolysis to more readily be stratified into different elevational levels. For instance, hydrogen gas can collect in greatest concentration at a junction between the ceiling 72 and the inlet end 74 of the enclosure 60. Where no liquid pyrolysates LP are expected, as in soil decontamination, the enclosure 60 can alternatively be substantially horizontal.

The enclosure 60 is preferably supported upon a structural support 78 which provides a foundation for the enclosure 60 above ground. Alternatively, the enclosure 60 can be supported upon a trailer or other mobile platform to facilitate use of the system 10 in a variety of different locations.

Influx material M passes into the enclosure 60 for pyrolysis through an entrance 76. The entrance 76 is formed in the ceiling 72 near the inlet end 74. The entrance 76 thus provides the enclosure 60 with access from the lower volume 48 of the influx shaft 40. In the alternative embodiment of FIGS. 10 through 15, the entrance 76 provides communication between the enclosure 60 and the feeder shaft 248.

The conveyor belt 80 (FIGS. 2, 4 and 6 through 8) is oriented within the enclosure 60 such that influx material M passing through the entrance 76 lands upon the conveyor belt 80 and is then drawn toward the discharge end 75 of the enclosure 60 along arrow A. The conveyor belt 80 is mounted upon two drums 82. One of the drums 82 is operatively coupled to a motor 84. The motor 84 causes the drums 82 to rotate, causing the conveyor belt 80 to operate with an upper flight thereof traveling along arrow A.

Figure 5:
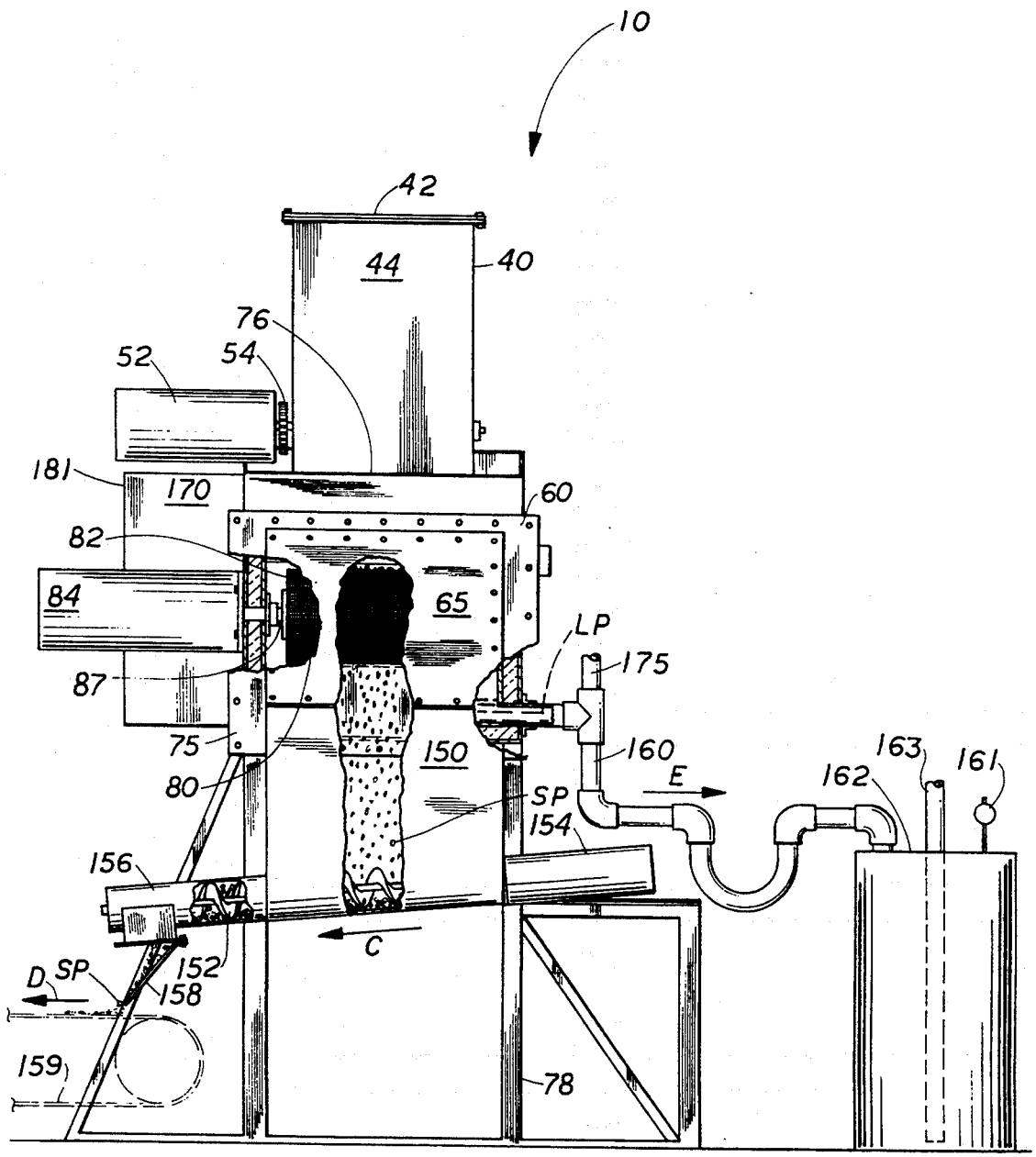
FIG. 5 is an end view of the system of this invention with portions thereof cut way to reveal interior details.

The motor 84 is preferably oriented outside of the enclosure 60 (FIG. 5). Drum adjustment covers 86 (FIGS. 6 through 8) provide access to an axle 87 upon which the drums 82 rotate. The drum adjustment covers 86 allow a user to access the axles 87 for minor adjustments to the drums 82. The drum adjustment covers 86 are preferably configured so that they sealably connect to the outer hull 84, preserving the environment within the enclosure 60. The conveyor belt 80 is preferably formed from a steel mesh material which has a melting point greater than 1,000° Fahrenheit. The belt 80 is preferably foraminous, allowing fluids to pass therethrough.

A tensioning means 90 (FIG. 3) insures that the conveyor belt 80 remains taut upon the drums 82. The tensioning means 90 includes a stationery idler 92 and a biased idler 94. Each of the idlers, 92, 94 is oriented adjacent the belt 80 on a lower flight thereof with the stationery idler preferably above a lower flight of the conveyor belt 80 and the biased idler preferably below the conveyor belt 80. The two idlers 92, 94 are preferably located proximate to each other. The biased idler 94 is supported within a slot 98 which allows the biased idler to translate vertically. A spring 96 applies a force on the biased idler 94 in a vertical upward direction. If the belt 80 is somewhat loose, the biased idler 94 is caused to be elevated by the spring 96 due to the lack of tension on the conveyor belt 80. This elevation of the biased idler 94 causes the belt 80 to be tensioned. In this way, a tension of the belt 80 is continuously maintained.

The belt 80 is prevented from sagging by a plurality of longitudinal belt supports 126 (FIGS. 2, 3 and 6 through 8). The longitudinal belt supports 126 are located below both the upper flight and the lower flight of the conveyor belt 80. The longitudinal belt supports 126 are shorter than a distance between the drums 82 and are preferably elongate with a low friction surface. The longitudinal belt supports 126 are supported in position below the belt 80 by a plurality of cross supports 128 which extend between sides 70 of the enclosure 60. The longitudinal belt supports 126 preferably include a first expansion joint 130 and a second expansion joint 132 therein which preserve a substantial linearity of the longitudinal belt supports 126 even when elevated temperatures are encountered within the enclosure 60. The conveyor belt 80 thus provides a pathway for influx material M to travel from the inlet end 74 of the enclosure 60 to the discharge end 75 of the enclosure 60.

As the influx material M is carried by the conveyor belt 80, pyrolysis occurs and liquid pyrolysate LP is allowed to pass through the conveyor belt 80. An oil drain tray 134 is oriented below the upper flight of the conveyor belt 80 and spans a width of the enclosure 60 between the belt drums 82. The drain tray 134 includes an entrance end 136 near the entrance 76 of the enclosure 60 and an exit end 138 beyond where pyrolysis occurs and near the discharge end 75 of the enclosure 60. The oil drain tray 134 is preferably sloped slightly downward along with the enclosure 60 so that any liquids collecting thereon are encouraged to migrate toward the discharge end 75 of the enclosure 60.

Figure 6:
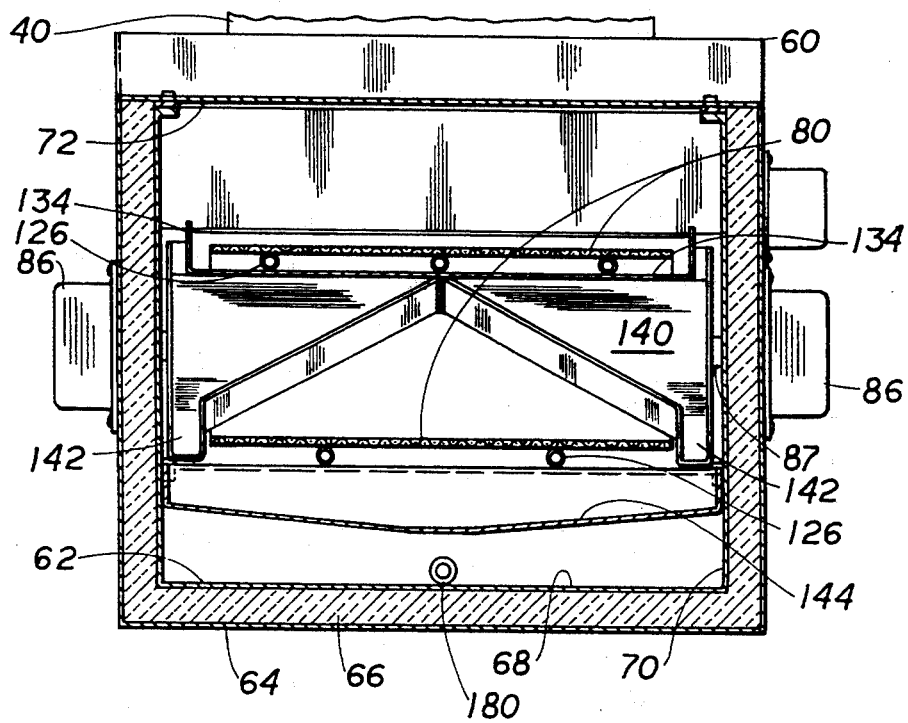
FIG. 6 is a sectional view taken along lines 6—6 of FIG. 3.

The exit end 138 of the oil drain tray 134 is in fluid communication with a drain tray ramp 140 (FIGS. 3 and 6). The drain tray ramp 140 is angled more steeply downward than the oil drain tray 134 and splits liquid pyrolysate LP from the oil drain tray 134 into two side channels 142. The two side channels 142 direct the liquid pyrolysate LP around the lower flight of the conveyor belt 80. The side channels 142 terminate above a drain trough 144 which collects liquid pyrolysates LP captured by the drain tray 134. The drain trough 144 includes an oil outlet 160 which passes from the drain trough 144 within the enclosure 60 through the sides 70 of the enclosure 60 and along arrow E into an oil container 162 (FIG. 5). In this way, liquid pyrolysate LP is collected within the enclosure 60 and drawn out of the enclosure 60 for storage and potential later use.

The oil outlet 160 preferably includes a U-section which prevents any gas within the oil outlet 160 from migrating back into the enclosure 60. The U-section thus further protects the environment within the enclosure 60 in an anaerobic state. The U-section also prevents gas pyrolysate GP from exiting the enclosure 60 through the liquid outlet 160. The oil outlet 160 communicates with an oil container 162 for storage of liquid pyrolysate LP drawn out of the enclosure 60. A line 163 is provided for periodic pumping of liquid pyrolysate LP out of the container 162 such as into a tanker truck. An air bleed valve 161 is in communication with the oil container 162 to balance a pressure within the oil container 162.

Figure 16:
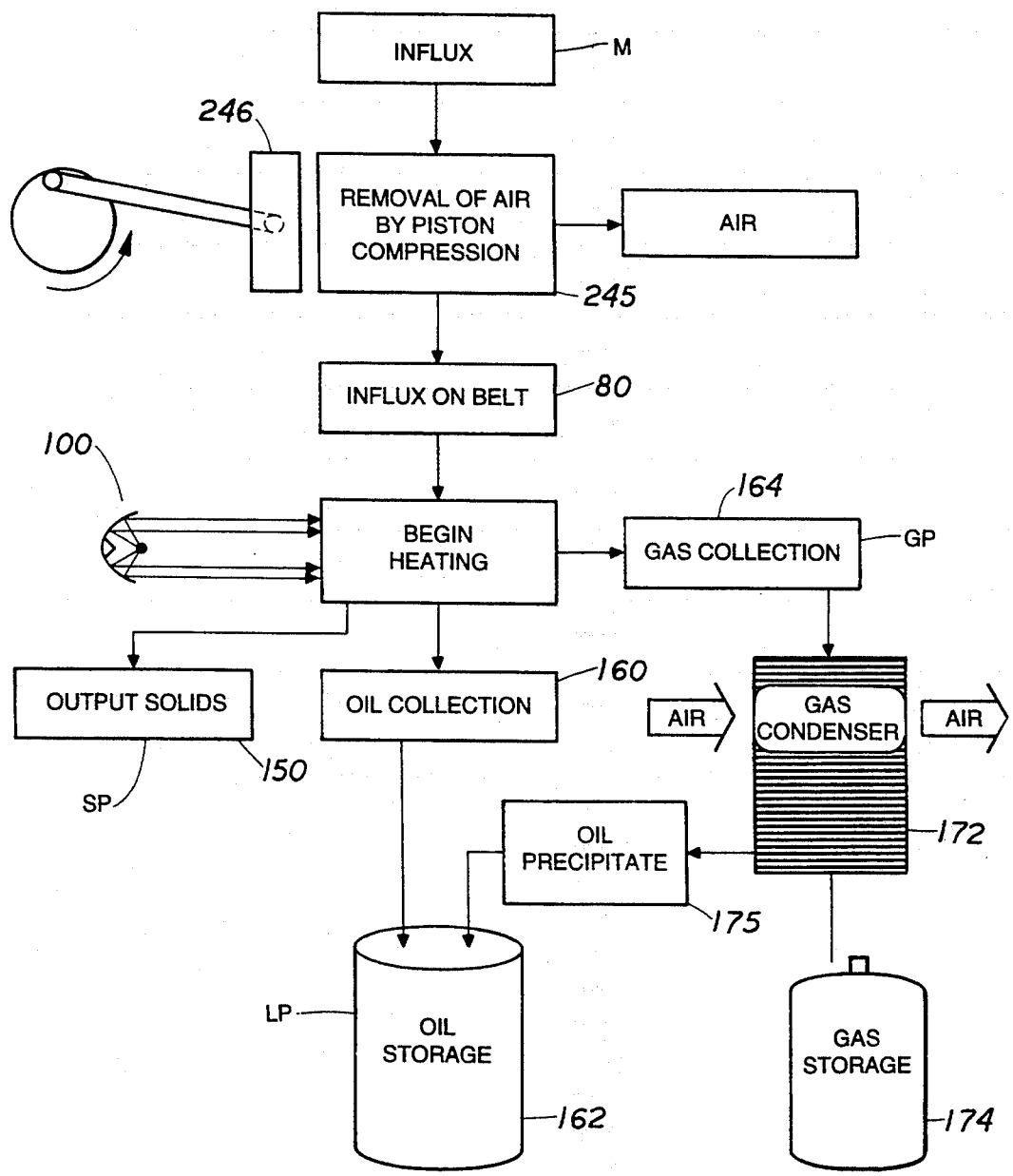
FIG. 16 is a block diagram revealing details of the function of this invention.

Referring now to FIGS. 1 through 2 and 16, details of output of gas pyrolysate GP out of the enclosure 60 are described. During pyrolysis, some of the influx material M is converted into gas pyrolysate GP. For instance, where tire shreds comprise the influx material M, pyrolysis produces a significant amount of methane gas as the gas pyrolysate GP. A gas outlet 164 is provided passing through both the inner hull 62 and outer hull 64 of the enclosure 60. As shown in FIG. 1, preferably the gas outlet 164 is located at an intermediate elevation between the floor 68 and the ceiling 72 of the enclosure 60.

Experience has shown that, when tire shreds comprise the influx material M, that hydrogen gas collects near the ceiling 72 and that oils which are gasified within the high temperature environment of the enclosure 60 collect near the floor 68 of the enclosure 60. By locating the gas outlet 164 at an intermediate elevation of the enclosure 60, a higher percentage of gas passing through the gas outlet 164 is methane (natural gas). As an alternative, numerous different gas outlets may be provided at different locations within the enclosure 60 which collect different gases for later use.

A gas outlet valve 166 is interposed within the gas outlet 164. The gas outlet valve 166 is capable of sealing off the gas outlet 164. When the gas outlet valve 166 is closed, a pressure within the enclosure 60 is allowed to build up. Preferably, the system 10 is operated with a slight positive pressure of approximately 1 psi over a pressure outside the enclosure 60. This positive pressure further assists in maintaining a substantially anaerobic environment within the enclosure 60.

The gas outlet 164 communicates with a condensor 172. The condensor 172 has air from an outside environment passing therethrough which causes a temperature of gas pyrolysate GP passing through the gas outlet 164 to be cooled. The condensor 172 condenses gas pyrolysates GP having a relatively high boiling point. The condensor 172 thus acts as a separator separating gas pyrolysates GP from liquid pyrolysates LP which are temporarily gasified within the enclosure 60. Liquid pyrolysates LP are outputted from the condensor 172 and can either be directed through a return conduit 175 and into the oil container 162 or can be collected separately.

The condensor 172 is also in fluid communication with a gas storage tank 174. The gas storage 174 collects gas pyrolysate GP which remains gaseous after passing through the condensor 172. The condensor 172 thus further purifies the gas pyrolysate GP. In the case where shredded tires comprise the influx material M, the condensor 172 further purifies natural gas collected within the gas storage tank 174.

Referring now to FIGS. 1, 3 and 5, details of the discharge of solid pyrolysate SP out of the enclosure 60 are described. The heating system 100 causes the influx material M to generate solid pyrolysate SP which remains upon the conveyor belt 80 after pyrolysis. The solid pyrolysate SP is thus carried to the discharge end 75 of the enclosure 60 where the belt 80 passes over the drum 82 adjacent the discharge end 75 of the enclosure 60. A discharge chute 150 is provided at the discharge end 75 of the enclosure 60 which accesses the enclosure 60. The discharge chute 150 is oriented such that the conveyor belt 80 passes partially thereinto as it transitions from the upper flight to the lower flight. Solid pyrolysate SP falls off the conveyor belt 80 and into the chute 150 as the belt 80 rounds the drum 82.

A lower end of the discharge chute 150 includes a discharge auger 152 supported within a casing 156. A motor 154 is operatively coupled to the auger 152 which causes the auger 152 to rotate. The discharge auger 152 is preferably Teflon-coated to provide a substantially airtight fit within the casing 156.

Preferably, solid pyrolysate SP is allowed to build up within the discharge chute 150 to discourage air from the outside environment from backing up through the discharge auger 152 and into the enclosure 60. The positive pressure maintained within the enclosure 60 further discourages such air migration. The discharge auger 152 outputs the solid pyrolysate SP along arrow C and onto a deflector 158 which can then either place the solid pyrolysate SP onto a discharge belt 159 and along arrow D or directly into a bin. The solid pyrolysate SP may then be used subsequently for a variety of purposes. For instance, where tire shreds comprise the influx material, the solid pyrolysate SP is primarily carbon black (elemental carbon) with perhaps chunks of steel therein. A magnet may be used to separate steel from the solid pyrolysate SP and the carbon black can be separated therefrom for later use.

Referring now to FIGS. 2, 3 and 7 through 9, details of the heating system 100 are described. Pyrolysis is caused within the enclosure 60 of the system 10 by heating the influx material M to a temperature at which the influx material M is caused to breakdown into constituent elements or compounds. The heating system 100 includes a plurality of heating rods 102 oriented transverse to the conveyor belt 80 and above an upper surface of the conveyor belt 80. The influx material M upon the upper flight of the conveyor belt 80 passes under the heating rods 102 sufficiently proximate thereto to cause pyrolysis to occur.

Before the influx material M passes under the heating rods 102, the influx material M is leveled by a leveler 124 (FIG. 2) which provides a uniform thin layer of influx material M for efficient and uniform pyrolysis of the influx material M. A back baffle 120 and side baffles 122 prevent the influx material M from falling around sides of the belt 80 or over the drum 82 adjacent the inlet end 74 of the enclosure 60. The baffles 120, 122 thus position the influx material M appropriately upon the belt and then the leveler 124 adjusts a thickness of a layer of influx material M upon the belt 80.

Each of the heating rods 102 is preferably an elongate metal construct having an electric current passing therethrough in such a way that resistance to electric current within the heating rods 102 causes the rods 102 to exhibit an extremely high temperature. In a preferred embodiment, the rods 102 should be capable of reaching at least 1,500° Fahrenheit. The heating rods 102 transfer heat by radiation F and conduction to the influx material M.

Preferably, each of the heating rods 102 is surrounded on an upper surface thereof by a parabolic reflector 104. The parabolic reflector 104 is oriented such that the associated heating rod 102 is at a focus of the parabolic reflector 104. Thus, each parabolic reflector 104 is of substantially constant parabolic cross section. The parabolic reflector 104 causes heat radiation F traveling from the heating rod 102 in an upward direction to be reflected downward upon the influx material M.

A V-deflector 106 is preferably oriented at a vertex of each parabolic reflector 104. The V-deflector 106 prevents heat radiation F traveling upward from the heating rods 102 from striking the parabolic reflector 104 at the vertex of the parabolic reflector 104. This prevents heat radiation F from the heating rod 102 from being reflected back against the heating rod 102, enhancing the life span of the heating rod 102. The V-deflector 106 is preferably shaped like the capital letter "V" in cross section with two planar sides skewed with respect to vertical and horizontal axes. A tip of the V-deflector 106 is pointed toward the rod 106 at the focus. The sides of the V-deflector are preferably reflective such that heat radiation F striking the V-deflector 106 is caused to be reflected downward, away from the heating rods 102, and against the influx material M.

Figure 7:
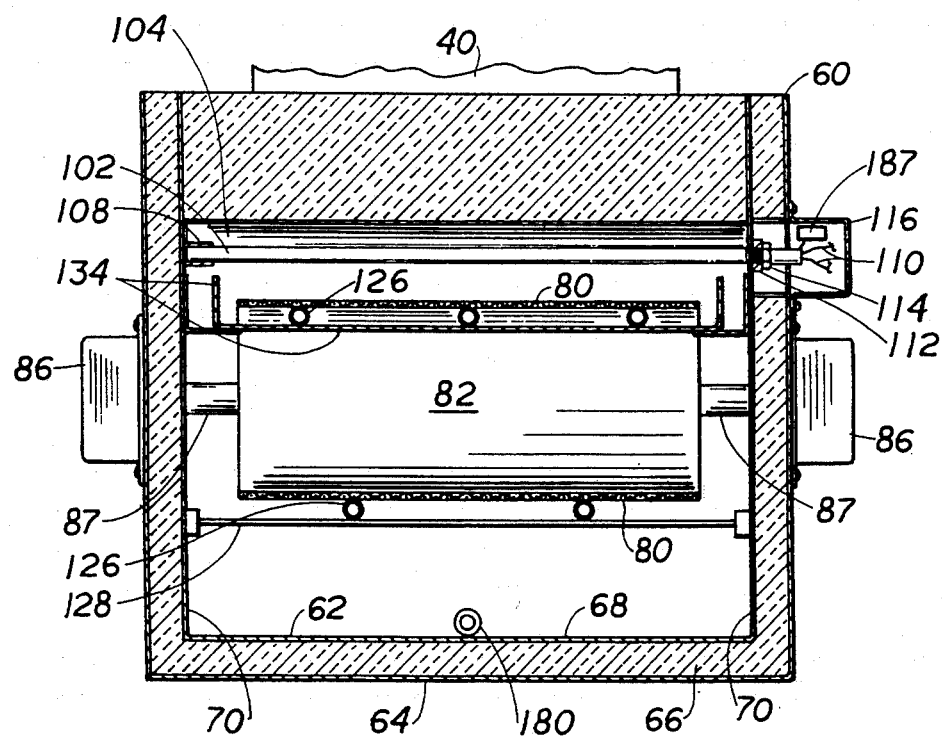
FIG. 7 is a sectional view taken along lines 7—7 of FIG. 3.
Figure 8:
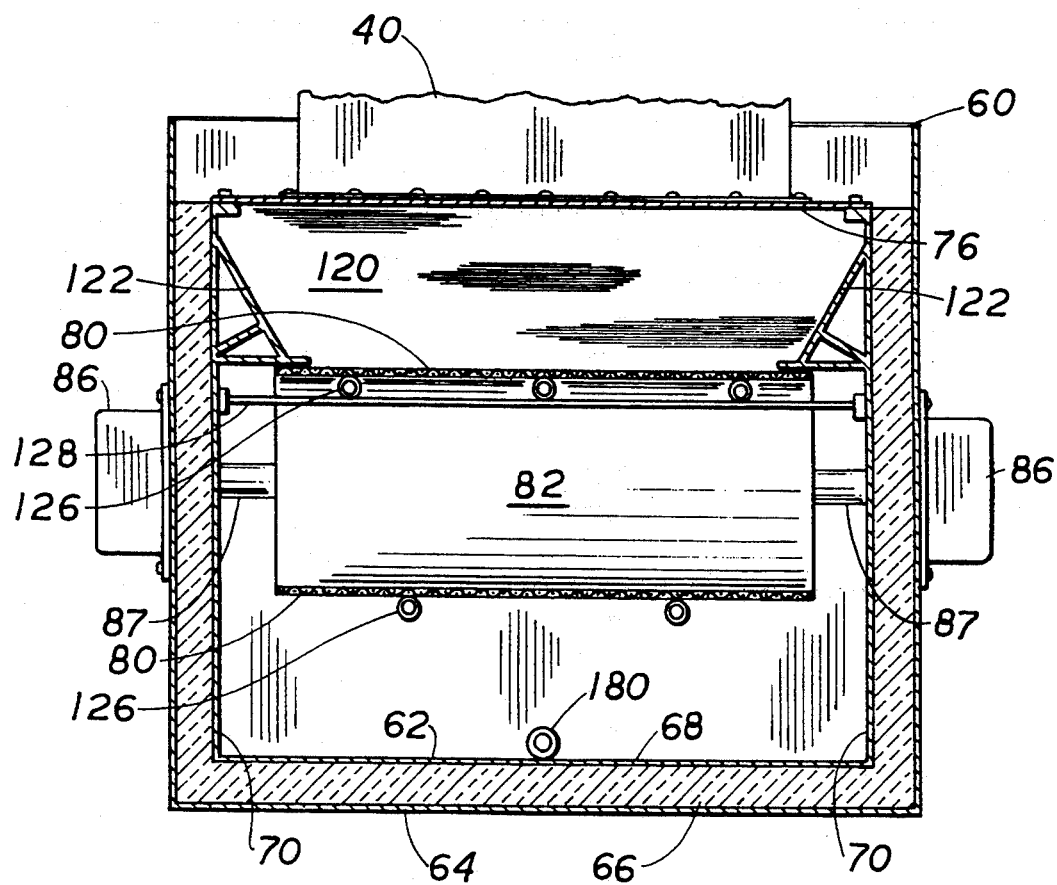
FIG. 8 is a sectional view taken along lines 8—8 of FIG. 2.
Figure 9:
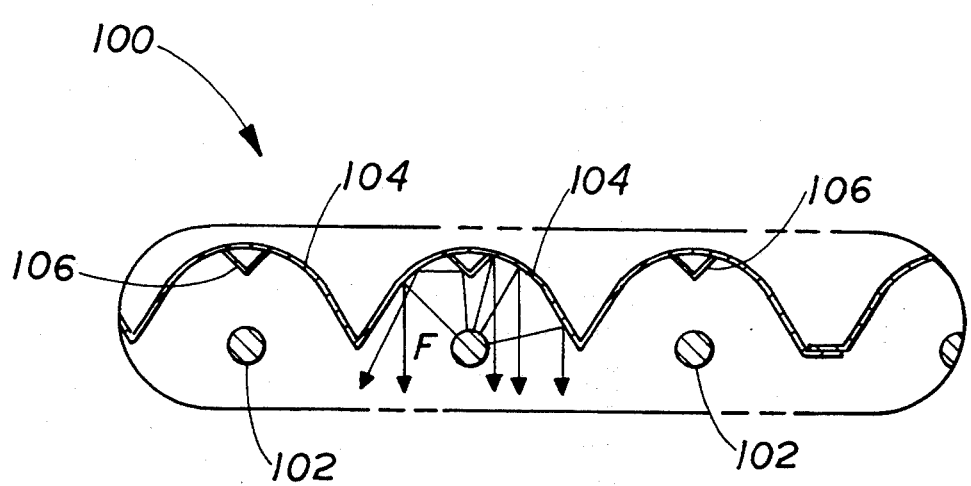
FIG. 9 is a detail of a portion of a heating means of this invention shown in section taken along lines 9—9 of FIG. 2.

With reference to FIG. 7, each heating rod 102 is supported within the enclosure 60 by a rod mount 108 and by a washer 112, nut 114 combination. A wire cover 116 surrounds wires 110 providing electric current to the heating rods 102. The wire cover 116 preferably is accessible from an exterior of the enclosure 60 for maintenance of the rods 102.

Figure 17:
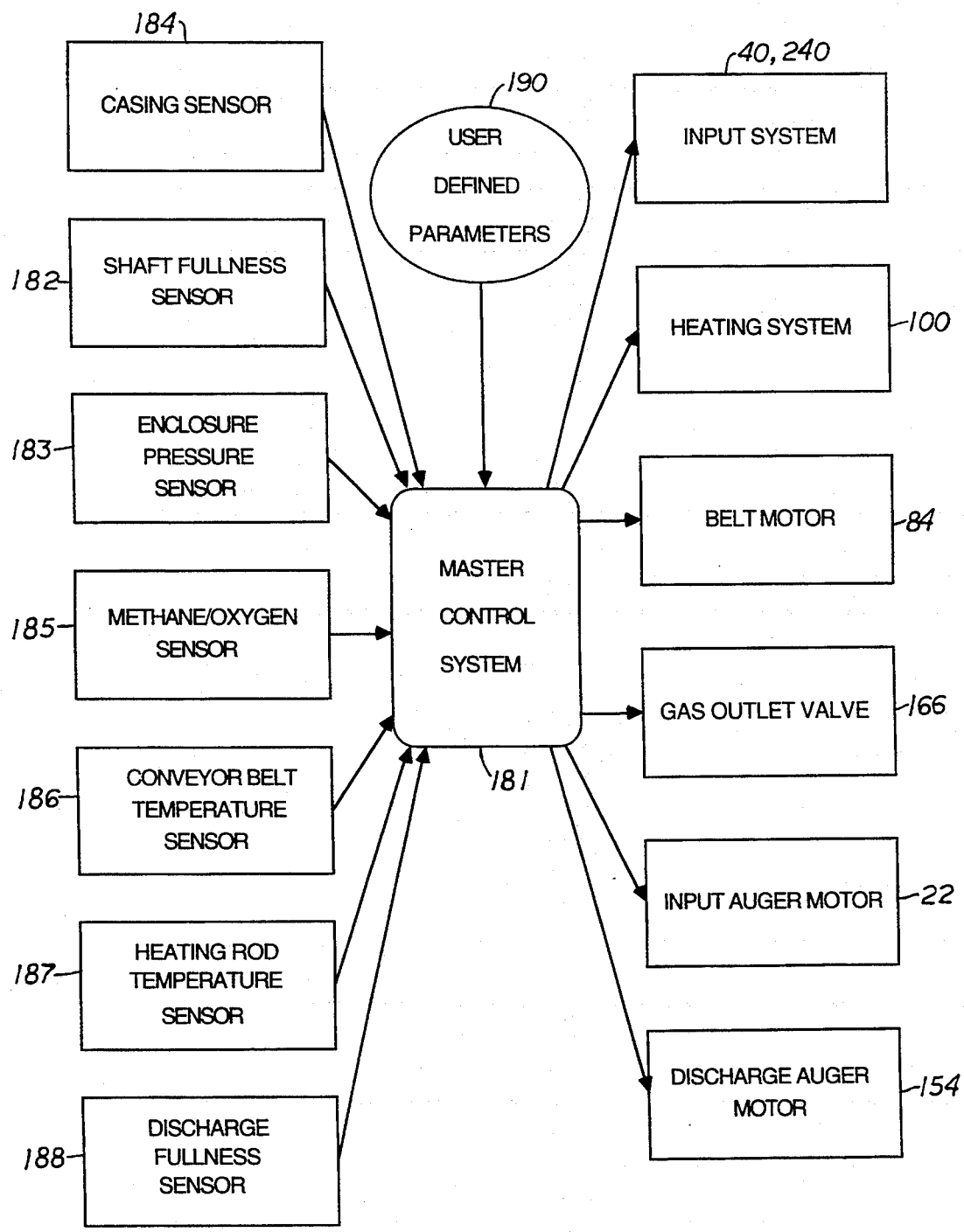
FIG. 17 is a flow diagram of a control system of this invention.

Referring now to FIG. 17, details of the master control system 181 are provided. Preferably, the system 10 is controlled by the master control system 181, located within an electronics cover 170 (FIG. 5), which causes the system 10 to operate within user-defined parameters substantially automatically. The master control system 181 preferably provides control for a number of separate systems within the pyrolysis system 10.

A belt temperature sensor 186 (FIG. 5) is oriented within the enclosure 60 and is operatively coupled to the control system 181. Also, a heating rod temperature sensor 187 (FIG. 7) is coupled to the rods 102. An amount of current passing through the wires 110 coupled to the heating rods 102 is also operatively coupled to the master control system 181. The master control system 181 is programmed to provide thermostatic control for the heating rods 102 to provide an amount of heat necessary to perform the pyrolysis of the influx material M. This thermostatic control maintains a temperature radiating from the heating rods 102 within desired parameters.

The belt temperature sensor 186 provides information to the master control system 181 as to a temperature of the belt 80, and hence the solid pyrolysate SP, after passing beyond the heating system 100. If a temperature detected by the belt temperature sensor 186 is insufficient for complete pyrolysis, the master control system 181 can elevate a temperature provided by the heating system 100 to the influx material M, causing more complete pyrolysis of the influx material M. Likewise, if the belt temperature sensor 186 detects a temperature higher than that necessary for complete pyrolysis of the influx material M or a temperature which could be detrimental to the belt 80 or other structures within the enclosure 60, the master control system 181 can decrease an amount of heat provided by the heating system 100.

The motor 84 driving the conveyor belt 80 is preferably adjustable in speed with adjustments thereto controllable by the master control system 181. If adequate temperatures are provided for the influx material M, the master control system 181 can alter the speed of the conveyor belt 80 to provide adequate residence time for the influx material M beneath the heating rods 102 of the heating system 100.

A pressure sensor 183 (FIG. 1) can be oriented within the enclosure 60 which monitors a pressure within the enclosure 60 and communicates this information to the master control system 181. The gas outlet valve 166 is preferably operatively coupled to the master control system 181 such that the master control system can open and close the gas outlet valve 166. The master control system 181 utilizes information relating to a pressure within the enclosure 60 to open and close the gas outlet valve 166 in a manner which maintains a positive pressure within the enclosure 60.

An influx shaft sensor 182 (FIG. 2) preferably is provided strategically in the upper volume 46 of the influx shaft 40 which monitors the presence of influx material M above the gap 56. The sensor 182 is operatively coupled to the master control system 181 along with controls for the operation of the feed motor 152. Thus, the master control system 181 can turn off the feed rollers 50 when an insufficient amount of influx material M is oriented thereabove. In this way, influx material M is maintained above the feed rollers 50 and air from the exterior environment is discouraged from passing into the enclosure 60.

In the alternative embodiment of FIGS. 10 through 15, air valve 254, anaerobic gas valve 258, piston 246 and plunger 250 are all operatively coupled to the master control system 181. The master control system 181 is configured to appropriately choreograph the positioning of the piston 246 and the plunger 250 and the opening and closing of the air valve 254 and anaerobic gas valve 258 to assure effective operation of the influx loader 240.

A discharge chute sensor 188 (FIG. 3) is preferably oriented within the discharge chute 160 which detects the presence of solid pyrolysate SP above the discharge auger 152 and communicates with the master control system 181. Also, controls for the motor 154 are operatively coupled to the master control system 181. Thus, the master control system 181 can turn off the discharge auger 152 when insufficient solid pyrolysate SP is oriented above the discharge auger 152 and to turn on the discharge auger 152 when sufficient solid pyrolysate SP is oriented above the discharge auger 152. This assures that no substantial amounts of air can pass into the enclosure 60 through the discharge chute 150.

In addition, the master control system 181 can perform various safety precaution steps to increase safety and operation of the pyrolysis system 10. For instance, if a pressure sensed by the pressure sensor 183 decreases below a level at which a positive pressure is being maintained within the enclosure 60, the master control system 181 can disable the heating system 100 to cool the influx material M and the pyrolysates GP, LP, SP to prevent combustion thereof if the anaerobic conditions within the enclosure 60 have been compromised. Also, gas sensors 185 (FIG. 1) which detect oxygen or methane can be utilized to provide direct confirmation of the maintenance of an anaerobic environment within the enclosure 60.

The influx auger motor 22 can also be controlled by the master control system 181 to prevent the shaft 40 from becoming overloaded. The master control system is programmable with user-defined parameters 190 such as temperature required for pyrolysis, maximum allowable belt 80 temperature, desired positive pressure in the enclosure 60, etc. The control system 181 can then operate the system 10 with minimal user interference.

In use and operation, and with particular reference to FIG. 16, details of the operation of the continuous pyrolysis system 10 are described. Initially, the pyrolysis system 10 must go through a start up procedure whereby an anaerobic environment is provided within the enclosure 60. A nitrogen inlet 180 (FIGS. 1, 2, and 6 through 8) is utilized to force nitrogen gas into the enclosure 60 and to substantially purge oxygen out of the enclosure 60. Preferably, various valves 161, 166 within the enclosure 60 and surrounding components are initially opened to allow air within the enclosure 60 to evacuate. The valves 161, 166 can then be closed once an environment within the enclosure 60 is sufficiently anaerobic.

Before any influx material M has gathered within the influx shaft 40, the enclosure 60 is still in fluid communication with the outside environment. Preferably, nitrogen gas is continued to be provided through the nitrogen inlet 180 at a sufficient flow rate to diminish any amount of oxygen passing through the gap 56 and into the enclosure 60. Similarly, before solid pyrolysate SP is located within the discharge chute 150, the enclosure 60 is in fluid communication with the outside environment through the discharge auger 152. Cross-sectional areas of the discharge auger 152 and gap 56 are selected to be small enough that nitrogen gas provided by the nitrogen inlet 180 can provide positive gas flow out of the enclosure 60 until steady state operation of the system 10 can be achieved.

Influx material M is then loaded into the in-feed hopper 30 and the influx auger 20 is activated by the motor 22, causing the influx material M to be drawn up the influx auger 20 and into the influx shaft 40. As influx material M collects over the rollers 50 within the influx shaft 40, a flow of gas out of the enclosure 60 is decreased. This increases flow of gas out of the enclosure 60 through the discharge auger 152 or an amount of nitrogen gas supplied through the nitrogen inlet 180 can be reduced. Once a sufficient amount of influx material M has collected above the feed rollers 50, the feed motor 52 can activate the feed rollers 50 allowing influx material M to pass through the influx shaft 40 and onto the conveyor belt 80.

The heating systems 100 and conveyor belt 80 can then be activated, causing the influx material M to pass under the operating heating rods 102. As the first influx material M is pyrolized, the atmosphere within the enclosure 60 is preferably substantially entirely nitrogen gas. The pyrolysis process causes generation of gas pyrolysate GP which occupies more volume than did the influx material M. Thus, the pyrolysis process increases a pressure within the enclosure 60. As the gas pyrolysate GP is formed and the pressure within the enclosure 60 is shown to increase, an amount of nitrogen gas supplied through the nitrogen gas outlet 180 can be further reduced. During this time, the gas outlet 164 preferably remains closed to increase a percentage of the atmosphere within the enclosure 60 which is gas pyrolysate GP, rather than nitrogen gas from the nitrogen inlet 180.

Liquid pyrolysate LP begins to collect upon the drain tray 140 and runs down through the drain trough 144 to the oil outlet 160. The outlet 160 fills such that liquid pyrolysate LP begins to collect within the U-section of the oil outlet 160. Once this occurs, an amount of gas escaping from the enclosure 60 through the air bleed valve 168 of the container 162 is reduced and gas passing through the nitrogen inlet 180 can be decreased accordingly.

The solid pyrolysate SP travels along the conveyor belt 80 and into the discharge chute 150. As solid pyrolysate SP collects within the discharge chute 150, an amount of gas escaping through the discharge auger 152 is significantly decreased. At this point, nitrogen is no longer needed to maintain positive pressure within the enclosure 60.

As positive pressure builds within the enclosure 60, the gas outlet valve 166 can be opened to regulate a pressure within the enclosure 60. Initially, a large portion of gas passing through the gas outlet 154 is nitrogen gas. As the system 10 continues to operate, nitrogen gas within the enclosure 60 diminishes and a percentage of nitrogen gas passing out of the enclosure 60 through the gas outlet 164 diminishes.

Preferably, the positive pressure maintained within the enclosure 60 causes only small amounts of gas pyrolysate GP to escape through the influx shaft 40 and through the discharge chute 150. A casing sensor 184 located along the casing 24 of the influx auger 20 is positioned between the influx shaft 40 and the hopper 30. The sensor 184 detects the presence of gas pyrolysate GP within the casing 24 and communicates with the master control system 181 (FIG. 17). Preferably, gas pyrolysate GP is allowed to pass down the influx auger casing 24 to a position near the sensor 184. Because the influx auger 20 is drawing material toward the influx shaft 40 and because gas pyrolysate GP is normally lighter than oxygen, a "bubble" of gas pyrolysate GP is formed within the casing 24 and the upper volume 46 of the influx shaft 40. This arrangement assists in preventing gas pyrolysate GP from escaping out of the in-feed hopper 30 in sufficient amounts while also preventing oxygen from passing into the enclosure 60.

In the alternative embodiment of FIGS. 10 through 15, the valves 254, 258 within the influx loader 240 can be utilized appropriately during start up to allow nitrogen gas to purge the influx loader 240 and then be closed as appropriate to allow for the beginning of the pyrolysis process. Specifically, the valves 254, 258 would remain open until a first quantum of influx material M is passed into the compression chamber 245. At which time, the anaerobic gas valve 256 would be closed and the influx loader 240 would commence operation as described in detail above with respect to FIGS. 10 through 15.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A system for continuously pyrolizing material into a pyrolysate of different constituents while in a substantially anaerobic environment, comprising in combination:

an enclosure, an entrance, a discharge and a substantially anaerobic interior, means for heating the material within said enclosure, means for entering the material into said enclosure at said entrance, means for removing the pyrolysate from said enclosure at said discharge, and means for conveying the material from said entrance towards said discharge;

said entrance including means to evacuate oxygen from the material entering said enclosure at said entrance, wherein said oxygen evacuation means includes a means to compress the material such that interstitial gases between solid portions of the material are diminished.

2. The system of claim 1 wherein said oxygen evacuation means includes a gas outlet which communicates with said material when said compression means compresses the material.

3. The system of claim 2 wherein said oxygen evacuation means includes a compression chamber in fluid communication with said gas outlet, said compression chamber including an inlet directing material into said compression chamber and an outlet for directing the material out of said compression chamber and into said enclosure, said compression chamber coupled to said compression means such that said compression means can compress material within said compression chamber.

4. The system of claim 3 wherein said compression chamber includes a means to purge said compression chamber of oxygen with an anaerobic gas, said purging means including an anaerobic gas passage in fluid communication with said compression chamber, whereby a prevalence of oxygen within the compression chamber can be diminished.

5. The system of claim 1 wherein said entrance communicates with an inlet exposed to an exterior environment through a passageway, said passageway having a central portion between said entrance and said inlet which is located at a higher elevation than both said entrance and said inlet, whereby said means to evacuate oxygen from the material is provided by said central portion of said passageway filling with gases lighter than oxygen and hence inhibiting oxygen from passing through said passageway and into said enclosure.

6. A system for continuously pyrolizing material into a pyrolysate of different constituents while in a substantially anaerobic environment, comprising in combination:

an enclosure, an entrance, a discharge and a substantially anaerobic interior, means for heating the material within said enclosure, means for entering the material into said enclosure at said entrance, means for removing the pyrolysate from said enclosure at said discharge, and means for conveying the material from said entrance towards said discharge;

said entrance including means to evacuate oxygen from the material entering said enclosure at said entrance, wherein said heating means includes a plurality of heat sources within the enclosure, said heat sources including a means to reflect heat therefrom toward the material within the enclosure, wherein said heat reflecting means includes a reflective surface having a parabolic shape with said heat source located near a focus of said parabolic surface, said parabolic surface located on a side of said heat source more distant from the material than said heat source, and wherein said parabolic surface includes a V-shaped deflector located near a vertex of said parabolic surface with a tip of said V-shaped deflector pointing toward said heat source, whereby heat radiating from said heat source and directed toward said vertex is prevented from being reflected back into contact with said heat source.

7. The system of claim 6 wherein said conveying means includes a conveyor belt within said enclosure and between said entrance and said discharge, said conveyor belt having an upper surface which faces said heating means, and wherein a drain tray is provided below said conveyor belt, said drain tray collecting liquid pyrolysate created by heating of the material upon said belt.

8. The system of claim 7 wherein said conveyor belt is porous, allowing liquid pyrolysate to pass therethrough, and is formed from a material having a melting temperature greater than 1,000° Fahrenheit, whereby said conveyor belt resists damage due to the heat from said heating means.

9. A system for continuously pyrolizing material into pyrolysate of different constituents while in a substantially anaerobic environment, comprising in combination:

an enclosure, an entrance, a discharge and a substantially anaerobic interior, means for heating the material within said enclosure, means for entering the material into said enclosure at said entrance, means for removing the pyrolysate from said enclosure at said discharge, and means for conveying the material from said entrance towards said discharge;

said entrance including means to evacuate oxygen from the material entering said enclosure at said entrance, wherein said discharge includes a gas pyrolysate outlet with a valve operatively coupled thereto, said valve operatively coupled to a pressure sensor through a control means causing said valve to be automatically closed when said pressure sensor registers a pressure within said enclosure which is less than that necessary to prevent substantial leakage of oxygen gas into said enclosure, and opens said valve when a pressure within said enclosure exceeds a user-defined pressure, whereby said control means maintains a pressure within said enclosure sufficient to maintain an anaerobic environment within said enclosure.

10. The system of claim 9 wherein said discharge includes a discharge auger having a sealing means disposed on a radial tip thereof and nested within a casing which prevents solid pyrolysate from passing through said discharge and out of said enclosure except by rotation of said discharge auger, said auger powered by a motor operatively coupled to said auger and causing said auger to rotate, said motor operatively coupled to a control system including a pyrolysate abundance detection means oriented adjacent an inlet of said auger, said control system activating said discharge auger when said pyrolysate abundance detection means detects a user-defined abundance of pyrolysate adjacent said inlet of said auger.

11. The system of claim 10 wherein said conveying means includes a conveyor belt, said conveyor belt driven by a motor including a motor speed control means, said conveyor belt including a belt temperature sensor adjacent thereto monitoring a temperature of said belt, said belt temperature sensing means and said belt motor speed control means operatively coupled such that a speed of the belt is decreased when a temperature of the belt decreases and a speed of the belt increases when said temperature of said belt increases;

whereby said control device assists material upon said conveyor belt in being heated to a sufficient temperature for pyrolysis to occur.

12. The system of claim 11 wherein said heating means includes a plurality of heat sources overlying said conveyor belt, said heat sources including a power source supplied thereto through a thermostatic control means, said thermostatic control means causing said heating means to maintain a temperature at which pyrolysis will occur.

13. The system of claim 12 wherein said gas pyrolysate outlet is operatively coupled to a condensor, said condensor causing vaporized liquid pyrolysates within said gas pyrolysate to be condensed out of said gas pyrolysate, and a means to separate the condensed liquid pyrolysate from the gas pyrolysate operatively coupled to an output of said condensor.

14. A system for continuous anaerobic pyrolysis of influx material, comprising in combination:

an enclosure having an entrance and a discharge and a substantially anaerobic interior, means for entering influx material into said enclosure at said entrance, means for removing the pyrolysate from said enclosure at said discharge, and means for heating the influx material within said enclosure, said heating means including a plurality of heat sources each located near a focus of a parabolic reflecting surface, said surface oriented to direct radiation toward the influx material, wherein said parabolic reflecting surface of said heating means includes a V-deflector oriented near a vertex of said parabolic reflecting surface, said V-deflector including reflective surfaces positioned to prevent radiation from said heat sources and directed towards said vertex from being reflected directly back at said heat sources, whereby a temperature of said heat sources is not increased as much by said parabolic reflecting surface.

15. The system of claim 14 wherein said removing means includes a gas pyrolysate outlet operatively coupled to a condensor and a liquid-gas separator, said condensor reducing a temperature of gas pyrolysate to a temperature below a boiling point of at least one of the compounds resulting from pyrolysis of the influx material, such that the gas pyrolysate is caused to have some compounds therein condense, said separator separating portions of the gas pyrolysate remaining gaseous from portions of the gas pyrolysate which condense into liquid pyrolysate upon passage through said condensor, whereby compounds pyrolized from the influx material in gaseous form are are divided into compounds having distinct boiling points.

16. A method for continuously pyrolyzing an influx material into different constituent compounds within an anaerobic environment, including the steps of:

providing an enclosure with an entrance, a discharge and a heating means therein, defining a quanta of influx material to be entered into the enclosure, compressing the quanta of influx material, purging oxygen from the quanta of influx material, entering the quanta of influx material into the enclosure without substantial oxygen coupled thereto, activating the heating means to pyrolize the influx material into pyrolysates, and discharging the pyrolysates from the disclosure.

17. The method of claim 16 including the further steps of:

conveying the influx material from the entrance to the discharge upon a conveyor belt, the conveyor belt coupled to a motor having a variable speed control means operatively coupled thereto, and controlling a speed of the conveyor belt to insure that the influx material is completely pyrolized before the influx material reaches the discharge.

18. The method of claim 17 wherein said activating the heating means step includes the steps of:

supplying power to a heat source, reflecting radiation emanating from the heat source and directed away from the conveyor belt back toward the conveyor belt with a parabolic reflecting surface, orienting the parabolic reflecting surface with the heat source located at a focus thereof, positioning a "V-deflector at a vertex of the parabolic surface, and controlling the supply of power to the heating means to maintain a temperature of the heating means within a desired range.

19. The method of claim 18 including the further step of separating liquid pyrolysate from gaseous pyrolysate by the steps of:

outputting gas pyrolysate from the enclosure, passing the gas pyrolysate through a condensor to cool the gas pyrolysate, and separately outputting liquid pyrolysates and gas pyrolysates exiting the condensor.

* * * * *